(12) United States Patent
Lim

(10) Patent No.: US 10,069,638 B2
(45) Date of Patent: Sep. 4, 2018

(54) LIGHT CONTROLLING SYSTEM AND REGISTRATION METHOD THEREOF

(71) Applicant: LG INNOTEK CO., LTD., Seoul (KR)

(72) Inventor: Won Taek Lim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 171 days.

(21) Appl. No.: 14/916,438

(22) PCT Filed: Sep. 2, 2014

(86) PCT No.: PCT/KR2014/008210
§ 371 (c)(1),
(2) Date: Mar. 3, 2016

(87) PCT Pub. No.: WO2015/034243
PCT Pub. Date: Mar. 12, 2015

(65) Prior Publication Data
US 2016/0205750 A1     Jul. 14, 2016

(30) Foreign Application Priority Data

Sep. 3, 2013   (KR) ........................ 10-2013-0105703

(51) Int. Cl.
*H04L 29/02*     (2006.01)
*H04B 10/116*    (2013.01)
(Continued)

(52) U.S. Cl.
CPC ............ *H04L 12/12* (2013.01); *H04L 12/283* (2013.01); *H04L 12/2809* (2013.01);
(Continued)

(58) Field of Classification Search
None
See application file for complete search history.

(56) References Cited

U.S. PATENT DOCUMENTS

2012/0230698 A1* 9/2012 Park ................... H04B 10/1149
                                                        398/118
2013/0043809 A1* 2/2013 Weaver .............. H05B 37/0272
                                                        315/297
(Continued)

FOREIGN PATENT DOCUMENTS

CN          102216792 A      10/2011
JP          2007066585 A      3/2007
(Continued)

OTHER PUBLICATIONS

International Search Report in International Application No. PCT/KR2014/008210, filed Sep. 2, 2014.
(Continued)

*Primary Examiner* — Duc T Duong
(74) *Attorney, Agent, or Firm* — Saliwanchik, Lloyd & Eisenschenk

(57) ABSTRACT

A touch panel according to the embodiment includes a substrate; a first electrode formed on the substrate in a first direction and including a plurality of sensor parts and connection parts connecting the sensor parts with each other; and a second electrode formed in a second direction crossing the first direction while being insulated from the first electrode and including a plurality of sensor parts and connection parts connecting the sensor parts with each other. The sensor parts and the connection parts include transparent conductive materials, and the connection parts have resistance lower than resistance of the sensor parts in at least one of the first and second electrodes.

17 Claims, 9 Drawing Sheets

(51) Int. Cl.
*H04W 60/00* (2009.01)
*H04L 12/12* (2006.01)
*H04L 12/28* (2006.01)
*H05B 37/02* (2006.01)

(52) U.S. Cl.
CPC ......... *H05B 37/02* (2013.01); *H05B 37/0272* (2013.01); *Y02D 50/40* (2018.01)

(56) References Cited

U.S. PATENT DOCUMENTS

| | | | | |
|---|---|---|---|---|
| 2013/0328481 | A1* | 12/2013 | Hiroi | H05B 37/0272 315/34 |
| 2013/0331038 | A1* | 12/2013 | Kusakari | H04B 1/03 455/66.1 |
| 2015/0048742 | A1* | 2/2015 | Wingren | H05B 37/0218 315/152 |
| 2018/0091223 | A1* | 3/2018 | Park | H04W 48/16 |

FOREIGN PATENT DOCUMENTS

| | | | |
|---|---|---|---|
| JP | 2009253494 A | 10/2009 | |
| JP | 2012251959 A | 12/2012 | |
| KR | 1020080067556 A | 7/2008 | |
| KR | 1020130043755 A | 5/2013 | |

OTHER PUBLICATIONS

Office Action dated May 26, 2017 in Chinese Application No. 201480058387.4, along with its English translation.

* cited by examiner

[Fig. 1]
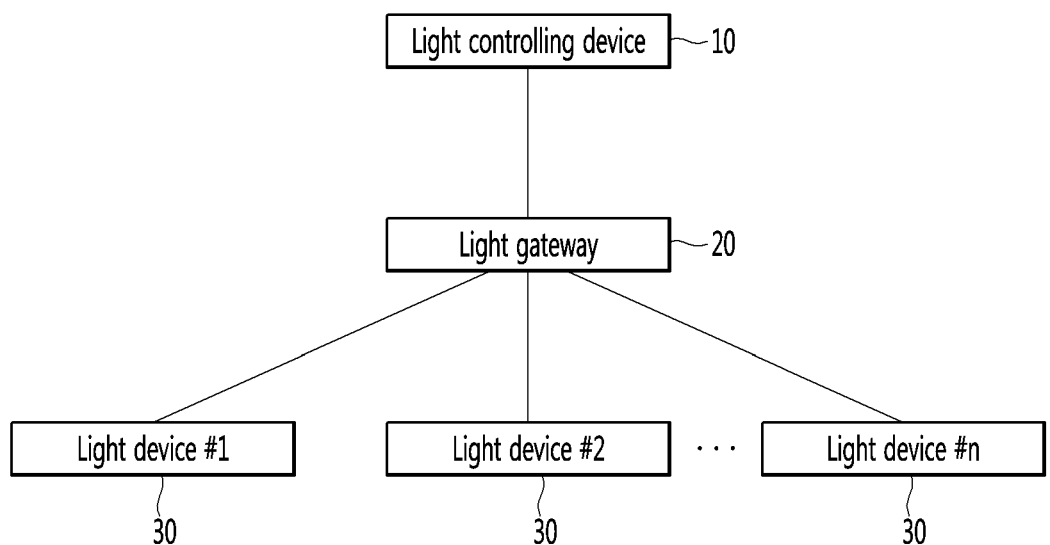

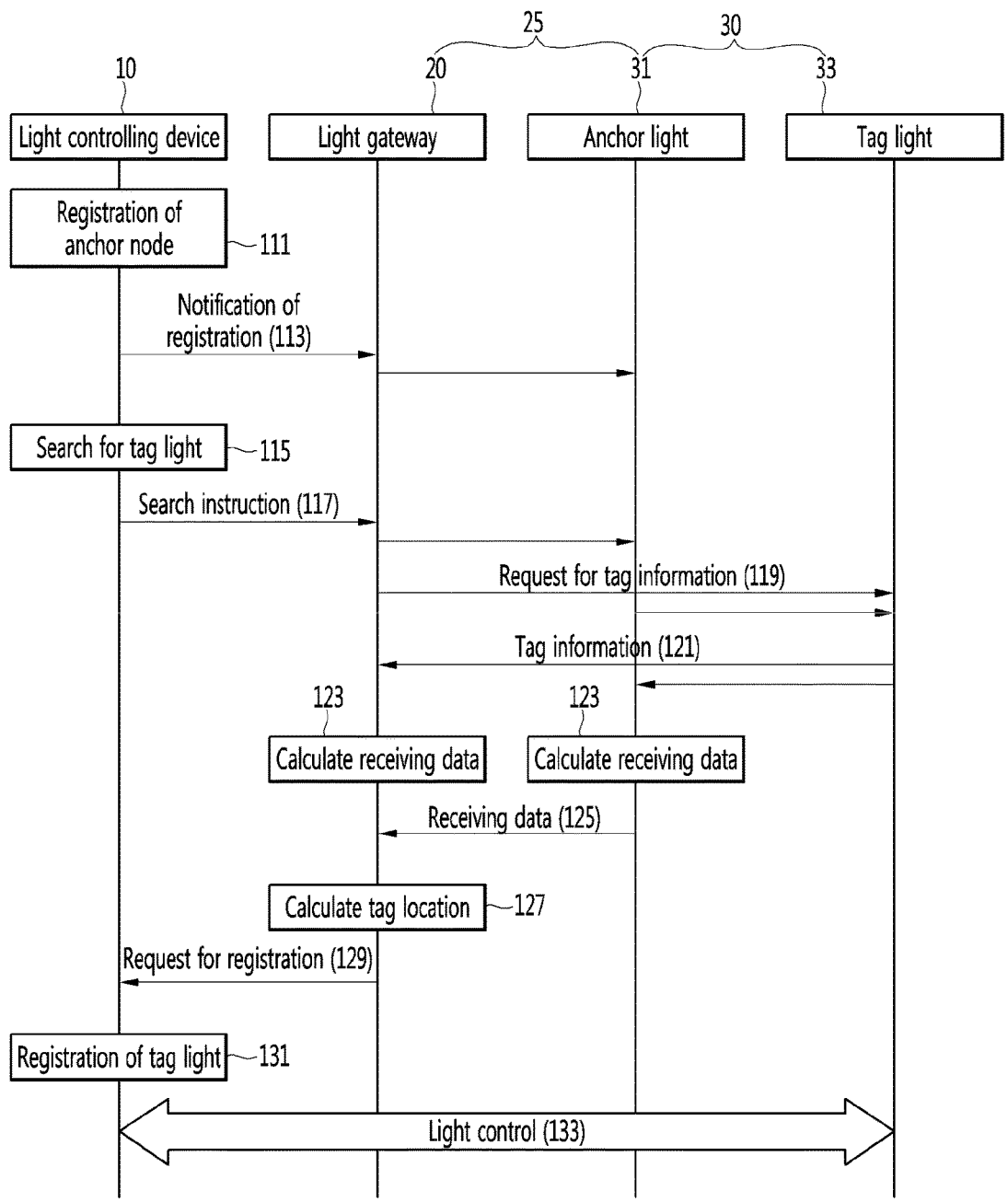
[Fig. 2]

【Fig. 3】
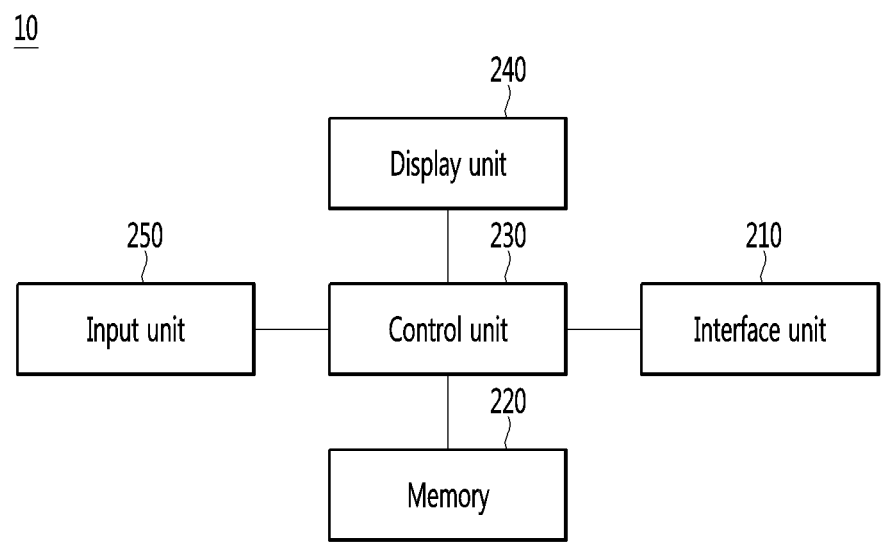

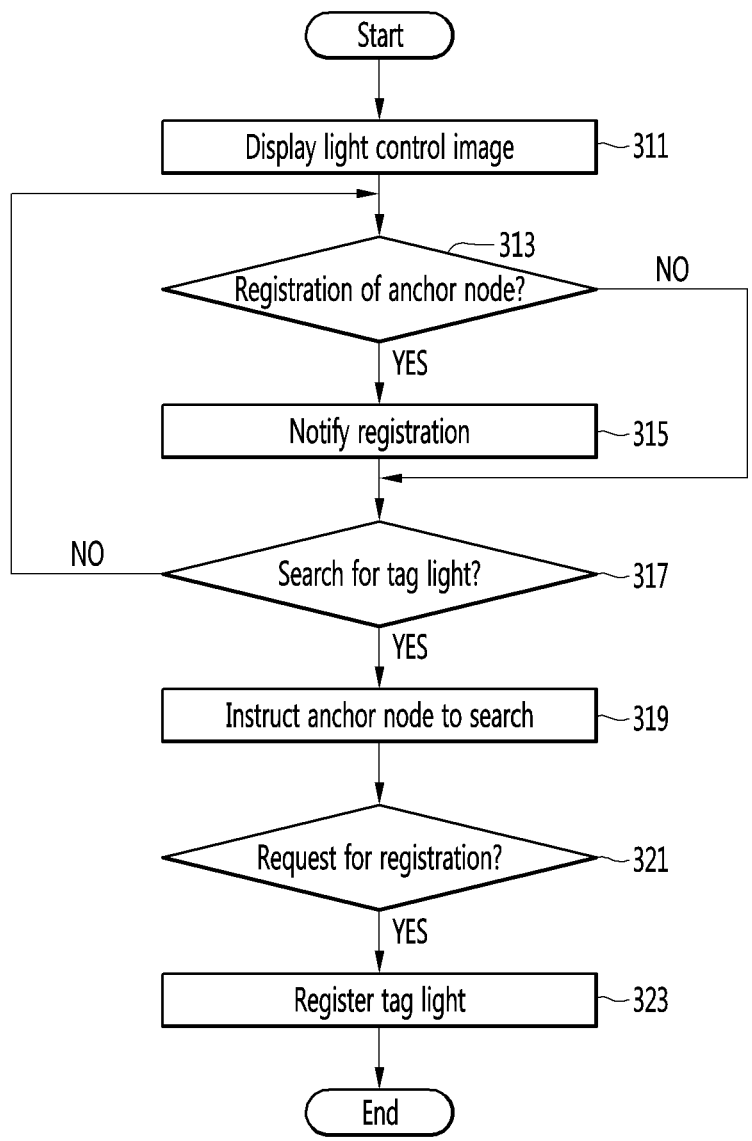

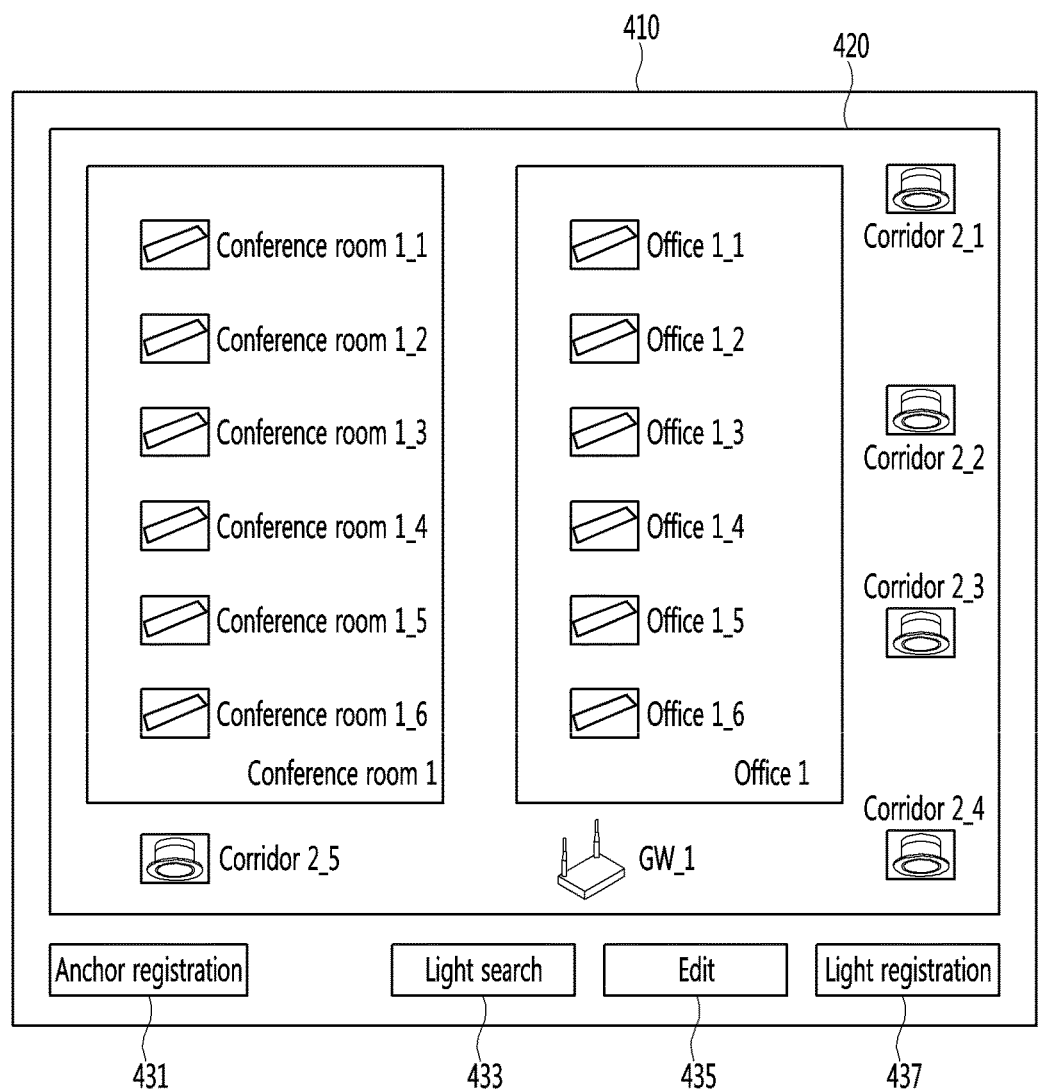
[Fig. 5]

[Fig. 6]
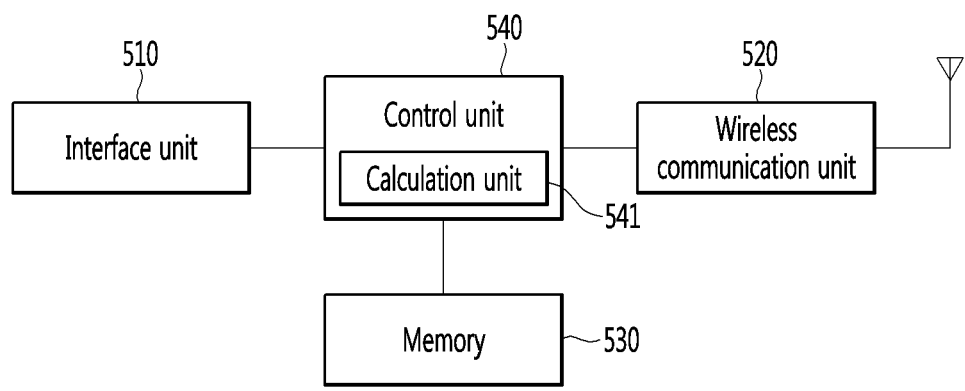

[Fig. 7]
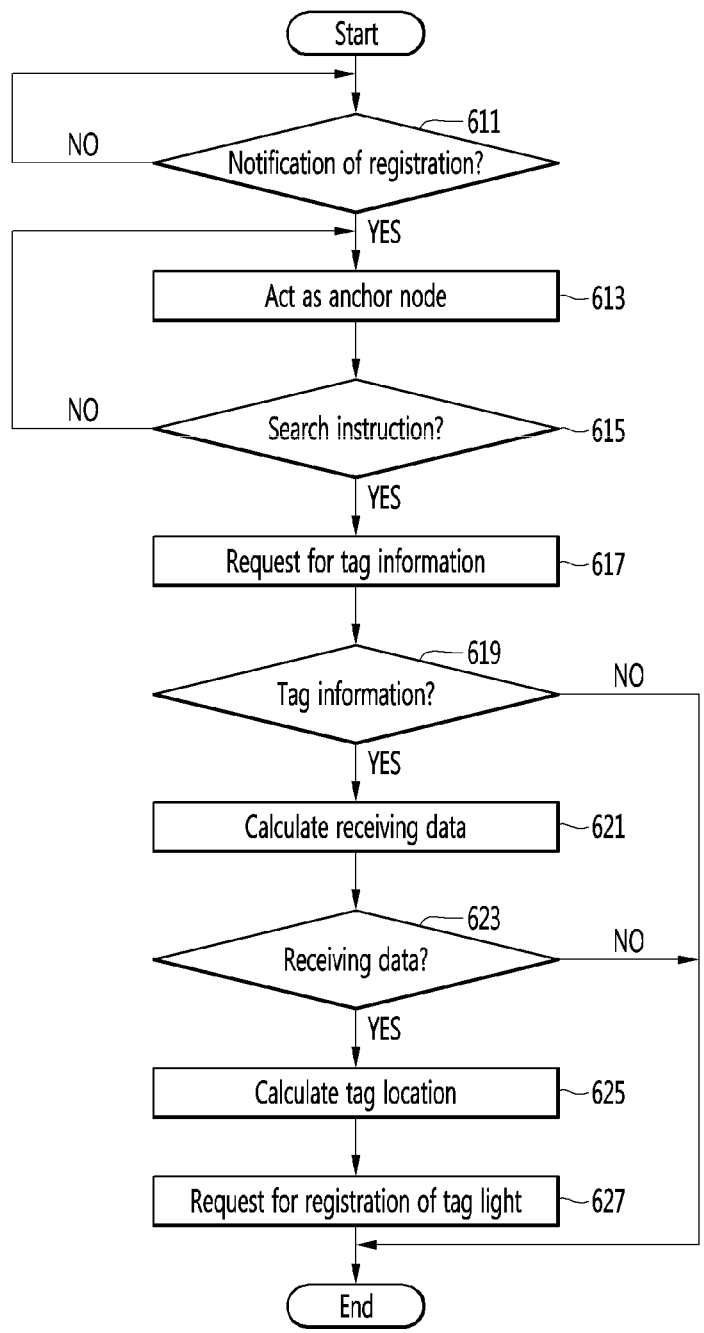

[Fig. 8]
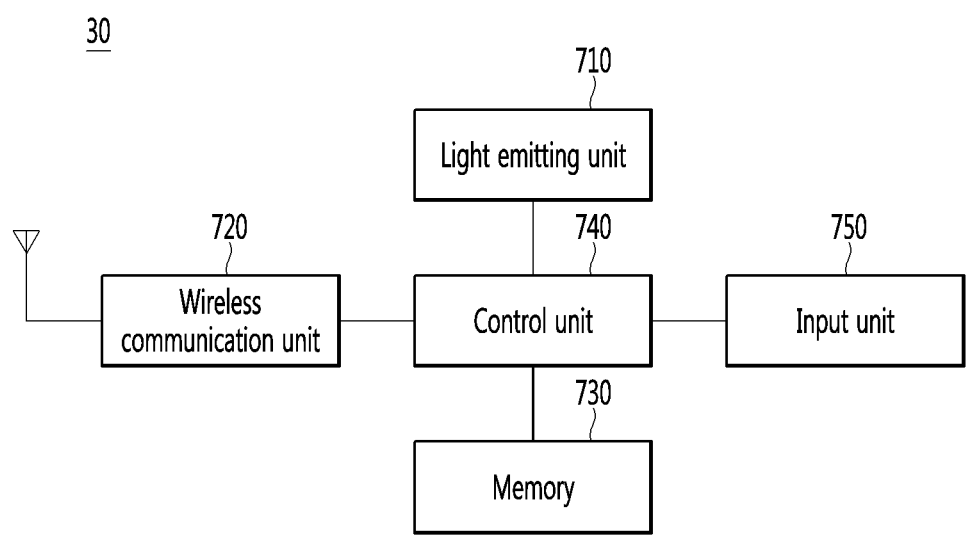

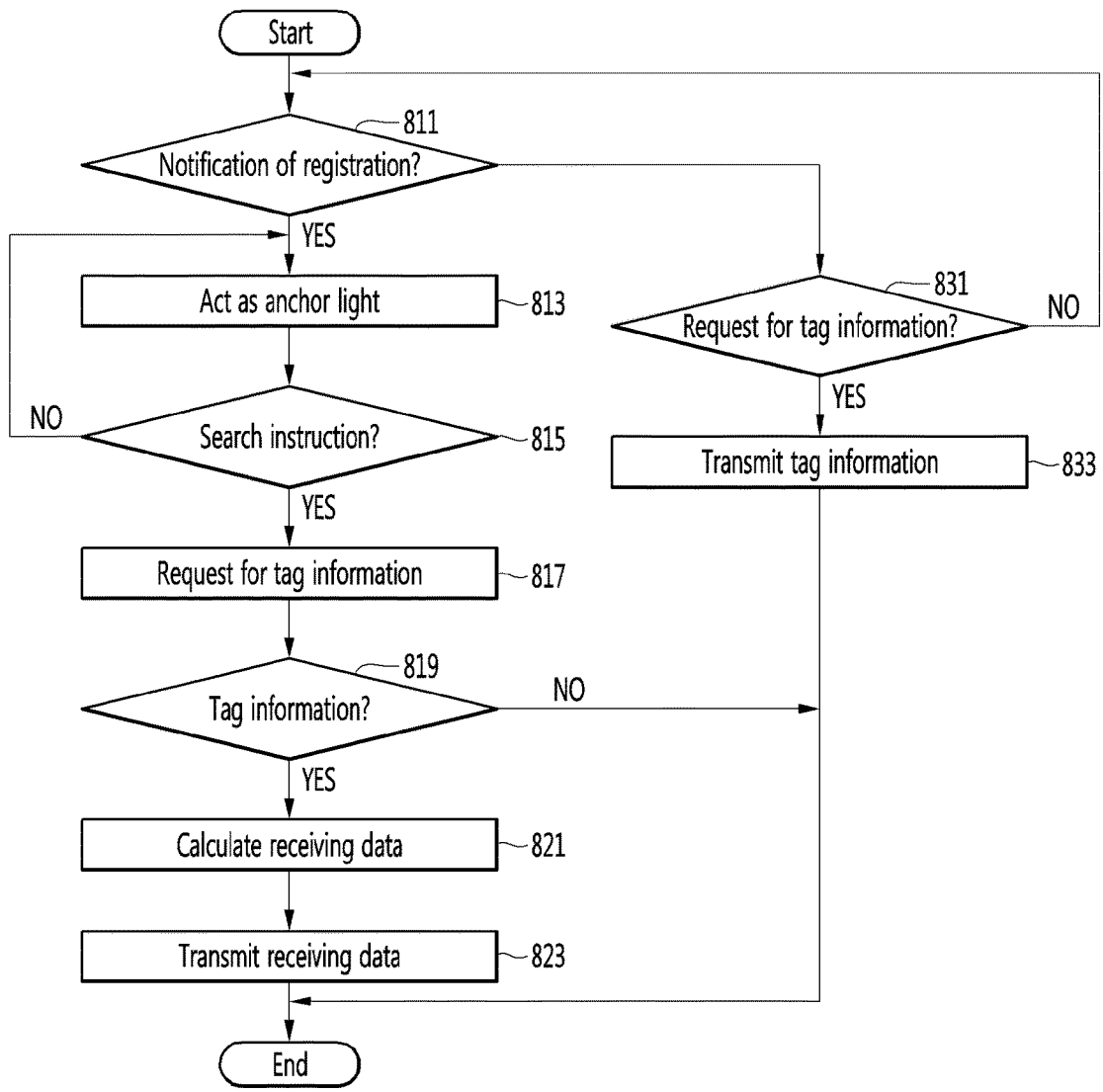
[Fig. 9]

LIGHT CONTROLLING SYSTEM AND REGISTRATION METHOD THEREOF

CROSS-REFERENCE TO RELATED APPLICATION

This application is the U.S. national stage application of International Patent Application No. PCT/KR2014/008210, filed Sep. 2, 2014, which claims priority to Korean Application No. 10-2013-0105703, filed Sep. 3, 2013, the disclosures of each of which are incorporated herein by reference in their entirety.

TECHNICAL FIELD

The disclosure relates to a light controlling system and an operating method thereof, and more particularly to a light controlling system and a registration method thereof.

BACKGROUND ART

In general, a light controlling device controls light devices in a light controlling system. In this case, the light controlling device wirelessly controls the light devices. To this end, the light devices must be registered in the light controlling device. In other words, the light controlling device stores identification information and location information of each light device. Accordingly, the light controlling device can control the light devices using the identification information and the location information.

However, in the light controlling device, a user of the light controlling device must inconveniently individually register the light devices. In other words, the user of the light controlling device must recognize the identification information and the location information of each light device and register the identification information and the location information of the light device into the light controlling device. Accordingly, time taken to register the light devices into the light controlling device is significantly required. In addition, various errors may be caused in the process of inputting the identification information and the location information of the light devices. Accordingly, the efficiency of the light controlling system may be degraded.

DISCLOSURE

Technical Problem

The embodiment provides a light controlling system having improved efficiency, and a registration method thereof.

In addition, the embodiment provides a light controlling system capable of improving the convenience of a user, and a registration method thereof.

In addition, the embodiment provides a light controlling system capable of easily registering light devices into a light controlling device, and a registration method thereof.

The objects of the embodiments are not limited to the above-mentioned objects, and other objects will be clearly understood from the following description by those skilled in the art unless otherwise defined.

Technical Solution

According to the embodiment, there is provided a registration method of a light device. The registration method includes collecting tag information from at least one tag light by anchor nodes, calculating a location of the at least one tag light based on the collected tag information by the anchor nodes, and registering the tag light into a light controlling device based on the tag information and the calculated location by the anchor nodes.

In addition, the calculating of the location includes calculating a distance between each of the anchor nodes and the tag light by the anchor nodes, and calculating the location of the tag light based on a location of each of the anchor nodes and the calculated distance by the anchor nodes.

Further, the anchor nodes include a light gateway, and the calculating of the location is performed by the light gateway.

Further, the collecting of the tag information is performed at a time point to receive a search instruction for the tag light, which is transmitted from the light controlling device.

Further, the registration method further includes selecting and registering the anchor nodes by the light controlling device.

The calculating of the location includes measuring receiving signal strength of the collected tag information, and calculating the location of the tag light based on the measured receiving signal strength.

The anchor nodes include an anchor light, and the anchor light includes at least one light device registered as an anchor node among a plurality of light devices.

Further, if an anchor light registered as the anchor node exists, the light gateway stores information on a location of the anchor light.

In addition, the light gateway calculates a location of the tag light based on the tag information collected by the anchor light and the location calculated by the anchor light, and the information on the location of the anchor light.

Further, the registering of the tag light includes transmitting information on the location of the tag light resulting from the collected tag information and the calculated location from the anchor node to the light controlling device, and storing the tag information and the location information, which are transmitted, in the light controlling device.

Meanwhile, a light controlling system includes at least one light device, anchor nodes that searches for the at least one light device, collects tag information of the at least one searched light device, and calculates a location of the at least one light device using the collected tag information, and a light controlling device that receives the tag information and location information on the calculated location corresponding to the at least one light device from the anchor nodes, stores the tag information and the location information that are received, and registers the at least one light device.

The anchor nodes calculates a distance between each of the anchor nodes and the at least one light device using the tag information and calculates a location of the at least one light device based on the location of each anchor node and the calculated distance.

In addition, the anchor nodes include a light gateway, and the light gateway receives the calculated distance from remaining anchor nodes except for the light gateway among the anchor nodes, and calculates the distance of the at least one light device based on the received distance.

Further, the anchor nodes collect the tag information at a time point to receive a search instruction for the at least one light device, which is transmitted from the light controlling device.

Further, the anchor nodes are selected and registered by the light controlling device.

In addition, the light controlling device includes a display unit that displays a light control image, and a control unit that registers at least one light gateway or light device as an anchor node through the light control image displayed on the display unit, and receives and stores tag information and location information of at least one light device, which is unregistered, using the registered anchor node.

Further, the control unit stores identification information and location information of the light gateway or the light device registered as the anchor node.

Further, the control unit transmits the identification information and the location information of the light device registered as the anchor node to the light gateway registered as the anchor node, if the light device registered as the anchor node exists.

In addition, the light gateway calculates a location of the at least one searched light device using location information of the light gateway, a distance between the light gateway and a light device corresponding to the collected tag information, a location of the light device registered as the anchor node, and a distance between the location of the light device registered as the anchor node and the light device corresponding to the tag information.

Advantageous Effects

In the light controlling system and the registration method thereof according to the embodiment, the light controlling device can easily register the light devices by searching for the light device using the anchor node.

In addition, according to the embodiment, it is unnecessary for the user of the light controlling device to detect the identification information and the location information of the light device and input the identification information and the location information of the light device into the light controlling device. Accordingly, the convenience of the user of the light controlling device can be improved. Therefore, the efficiency of the light controlling system can be improved.

DESCRIPTION OF DRAWINGS

FIG. 1 is a block diagram showing the structure of a light controlling system according to the embodiment of the disclosure.

FIG. 2 is a flowchart showing a registration procedure of the light controlling system according to the embodiment of the disclosure.

FIG. 3 is a block diagram showing the internal structure of a light controlling device according to the embodiment of the disclosure.

FIG. 4 is a flowchart showing a registration procedure of the light controlling device according to the embodiment of the disclosure.

FIG. 5 is a view showing a light control image of the light controlling device according to the embodiment of the disclosure.

FIG. 6 is a block diagram showing the internal structure of a light gateway according to the embodiment of the disclosure.

FIG. 7 is a flowchart showing a registration procedure of the light gateway according to the embodiment of the disclosure.

FIG. 8 is a block diagram showing the internal structure of the light device according to the embodiment of the disclosure.

FIG. 9 is a flowchart showing a registration procedure of the light device according to the embodiment of the disclosure.

BEST MODE

Mode for Invention

Hereinafter, the embodiments of the disclosure will be described in more detail with reference to accompanying drawings. It should be noticed that the same elements in the accompanying drawings are indicated with the same reference numerals. In addition, the details of the well-known functions and configurations, which may make the subject matter of the disclosure unclear, will be omitted from the following description.

In the following description, the term "anchor node" denotes a node used to register a light device into a light controlling device.

In this case, an anchor node may include a light gateway and a light device.

In this case, when an anchor node is a light device, the anchor node may be used to register remaining light devices except for the anchor node into a light controlling device.

In addition, the term "anchor light" denotes a light device acting as an anchor node among a plurality of light devices.

Further, the term "tag light" denotes a light device registered into a light controlling device by an anchor node among a plurality of light devices.

FIG. 1 is a block diagram showing the structure of a light controlling system according to the embodiment of the disclosure.

Referring to FIG. 1, a light controlling system according to the present embodiment includes a light controlling device 10, at least one light gateway 20, and a plurality of light devices 30. The light controlling device 10 and the light gateway 20 may be connected with each other through a wireless or wired scheme. In addition, the light gateway 20 is connected with the light devices 30 through the wireless scheme. In other words, the light gateway 20 relay communication between the light controlling device 10 and the light devices 30. Accordingly, the light controlling device 10 may control the light devices 30 through the light gateway 20.

To this end, in the light controlling system, the light gateway 20 and the light devices 30 are registered into the light controlling device 10. In this case, the light controlling system may register the light devices 30 through a real time location system (RTLS) scheme. In other words, the light gateway 20 may be registered as an anchor node (25 of FIG. 2) into the light controlling device 10. In addition, the light devices 30 may be registered as anchor lights (31 of FIG. 2) or tag lights (33 of FIG. 2) in the light controlling device. In this case, the anchor node 25, that is, the light gateway 20 and the anchor light 31 may be used to register a tag light 33 into the light controlling device 10.

FIG. 2 is a flowchart showing a registration procedure of the light controlling system according to the embodiment of the disclosure.

Referring to FIG. 2, the registration procedure of the light controlling system according to the present embodiment starts from that the light controlling device 10 registers the anchor node 25 in step 111. In this case, the light controlling device 10 registers the light gateway 20 or the anchor light 31 as the anchor node 25. In addition, the light controlling device 10 stores identification information and location information of the anchor node 25. In this case, the user of the light controlling device 10 detects the identification information and the location information of the anchor node 25 to input the identification information and the location information into the light controlling device 10. Accordingly, at least three anchor nodes 25 may be registered into the light controlling device 10. In addition, if the anchor nodes 25 are registered, the light controlling device 10 notifies the registration to the anchor node 25 in step 113. In this case, the light controlling device 10 notifies the registration to the light gateway 20 and the anchor light 31. In this case, if the light controlling device 10 notifies the registration to the light gateway 20, the light gateway 20 may forward the notification to the anchor light 31. Further, when the light controlling device 10 notifies the registration to the light gateway 20, the light gateway 20 may detect and store the location information of the anchor light 31.

Next, in the state that the anchor node 25 is registered, the light controlling device 10 searches for the tag light 33 in step 115. In this case, the light controlling device 10 may search for the tag light 33 according to the request of the user. In addition, the light controlling device 10 instructs the anchor node 25 to perform the search in step 117. In this case, the light controlling device 10 instructs the light gateway 20 and the anchor light 31 to perform the search. In this case, if the light controlling device 10 instructs the light gateway 20 to perform the search, the light gateway 20 may forward the instruction to the anchor light 31.

Next, the anchor node 25 requests tag information from the tag light 33 in step 119. In this case, the light gateway 20 and the anchor light 33 individually request the tag information. In addition, the anchor node 25 broadcasts a request message for the tag information. In this case, the request message may include the identification information of the anchor node 25.

Next, if the tag information is requested by the the anchor node 25, the tag light 33 transmits the tag information to the anchor node 25 in step 121. In this case, if the tag light 33 exists within a set distance from the anchor node 25, the tag light 33 receives the request of the anchor node 25. In addition, the tag light 33 transmits tag information to the anchor node 25 corresponding to the request of the anchor node 25. In addition, the tag information includes identification information of the tag light 33. In this case, the tag light 33 may transmit the tag information to the anchor node 25 based on the identification information of the anchor node 25. In other words, the tag light 33 may individually transmit the tag information to the light gateway 20 and the anchor light 31. In addition, the tag light 33 may broadcast the tag information.

Thereafter, if the tag information is received from the tag light 33, the anchor node 25 calculates receiving data in step 123. In other words, the anchor node 25 calculates the receiving data based on the tag information. In this case, the receiving data includes the distance between the anchor node 25 and the tag light 33. For example, the anchor node 25 may measure the receiving signal strength of the tag information to calculate the distance between the anchor node 25 and the tag light 33. In this case, the light gateway 20 and the anchor light 31 individually the receiving data. Subsequently, the anchor light 31 transmits the receiving data to the light gateway 20 in step 125. In this case, the anchor light 31 transmits the receiving data together with the identification information of the tag light 33.

Thereafter, the light gateway 20 calculates the tag location of the tag light 33 in step 127. In other words, the light gateway 29 calculates the tag location of the tag light 33 using the receiving data of the anchor light 31 together with the receiving data of the light gateway 29. Further, the light gateway 20 calculates the tag location of the tag light 33 using the location information of the light gateway 20 and the location information of the anchor light 31. In addition, the light gateway 20 may calculate the tag location of the tag light 33 through a triangulation scheme. Thereafter, the light gateway 20 requests the light controlling device 10 to register the tag light 33 thereto in step 129. In this case, the light gateway 20 transmits the identification information of the tag light 33 and the location information representing the tag location of the tag light 33 to the light controlling device 10.

Thereafter, if the request for the registration of the tag light 33 is received from the light gateway 20, the light controlling device 10 registers the tag light 33 in step 131. In this case, the light controlling device 10 stores the identification information and the location information of the tag light 33.

Accordingly, the light controlling device 10 may control the light devices 30 in step 133. In this case, the light controlling device 10 may control the light devices 30 through the light gateway 20. In addition, the light controlling device 10 may control the anchor light 31 and the tag light 33.

FIG. 3 is a block diagram showing the internal structure of the light controlling device according to the embodiment of the disclosure.

Referring to FIG. 3, the light controlling device 10 according to the present embodiment includes an interface unit 210, a memory 220, a control unit 230, a display unit 240, and an input unit 250.

The interface unit 210 is in charge of communication of the light controlling device 10. In this case, the interface unit 210 makes communication with the light gateway 20. The interface unit 210 may be connected with the light gateway 20 through a wireless scheme by including an antenna (not shown). Alternatively, the interface unit 210 may be connected with the light gateway 20 through a wired scheme.

The memory 220 includes a program memory and a data memory. The program memory stores programs to control general operations of the light controlling device 10. In this case, the program memory may store programs to register the light device 30 in the light controlling device 10. The data memory stores data generated in the middle of executing the programs in the light controlling device 10. In this case, the data memory may store the identification information and the location information of the light gateway 20 and the light device 30.

The control unit 230 controls the overall operation of the light controlling device 10. The control unit 230 registers the light device 30. In this case, the control unit 230 stores the identification information and location information of the light device 30 in the memory 220. Alternatively, the control unit 230 may register the light gateway 20 as the anchor node 25. In addition, the control unit 230 may register the light devices 30 as the anchor light 31 or the tag light 33. In this case, the control unit 230 may register the tag light 33 using the anchor node 25, that is, the light gateway 20 and the anchor light 31.

The display unit 240 displays the status of the light controlling device 10. In this case, the display unit 240 displays the light gateway 20 and the light devices 30 under the control unit 230. In this case, the display unit may display the identification information and location information of the light gateway 20 and the light devices 30.

The input unit 250 provides an interface to set and perform various functions of the light controlling device 10.

FIG. 4 is a flowchart showing a registration procedure of the light controlling device according to the embodiment of the disclosure. FIG. 5 is a view showing a light control screen image of the light controlling device according to the embodiment of the disclosure.

Referring to FIG. 4, the registration procedure of the light controlling device 10 according to the present embodiment starts from that the control unit 230 displays a light control image 410 in step 311. In this case, the control unit 230 may display the light control image 410 as shown in FIG. 5. In this case, the light control image 410 includes a registration list window 420 to display the light gateway 20 and the light device 30, which are registered, a menu 431 to register the anchor node 25, a menu 433 to search for the tag light 33, a menu 435 to edit the registration list window 420, and a menu 437 to register the tag light 33.

Thereafter, if the anchor node 25 is registered, the control unit 230 detects the registration of the anchor node 25 in step 313, and notifies the registration to the anchor node 25 in step 315. In this case, if the menu 431 to register the anchor node 25 is selected on the light control image 410, the control unit 230 may register the anchor node 25. In other words, the control unit 230 registers the light gateway 20 or the anchor light 31 as the anchor node 25. In addition, the control unit 230 stores the identification information and location information of the anchor node 25. In this case, as the user of the light controlling device 10 inputs the identification information and location information of the anchor node 25, the control unit 230 may store the identification information and location information of the anchor node 25. Accordingly, the control unit 230 may register at least three anchor nodes 25. Thereafter, the control unit 230 notifies the registration to the anchor nodes 25. In this case, the control unit 230 notifies the registration to the light gateway 20 and the anchor light 31. In this case, the control unit 230 transmits the identification information and location information of the anchor light 31 to the light gateway 20.

Subsequently, if a request is made to search for the tag light 33, the control unit 230 detects the request in step 317, and instructs the anchor node 25 to search for the tag light 33 in step 319. In this case, if the menu 433 to search for the tag light 33 is selected on the light control image 410, the control unit 230 may search for the tag light 33. In this case, the control unit 230 instructs the light gateway 20 and the anchor light 31 to search for the tag light 33.

Finally, if the light gateway 20 requests the registration of the tag light 33, the control unit 230 detects the request for the registration of the tag light 33 in step 321, registers the tag light 33 in step 323, and the registration procedure of the light controlling device 10 is completed. In this case, the control unit 2230 receives and stores the identification information and location information of the tag light 33 from the light gateway 20. If the menu 437 to register the tag light 33 is selected on the light control image 410, the control unit 230 may store the identification information and location information of the tag light 33. In addition, the control unit 230 adds the tag light 33 to the registration light window 420 on the light control image 410. In this case, if the menu 435 to edit the registration light window 420 is selected on the light control image 410, the control unit 230 may input an additional name corresponding to the identification information of the tag light 33.

Meanwhile, in the state that the light control image 410 is displayed, if a request is made to search for the tag light 33, the control unit 230 may detect the request in step 317, and may perform steps 319 and 323. Accordingly, the control unit 230 may update and register the tag lights 33 using the anchor node 25 which is previously registered.

Meanwhile, in the state that the light control image 410 is displayed, the control unit 230 may change or add the anchor node 25 by performing steps 313 and 315. Thereafter, the control unit 230 may perform step 317 and 323. Therefore, the control unit 230 may detect and register the tag light 33 located in a shadow place.

FIG. 6 is a block diagram showing the internal structure of the light gateway according to the embodiment of the disclosure.

Referring to FIG. 6, the light gateway 20 according to the present embodiment includes an interface unit 510, a wireless communication unit 520, a memory 530, and a control unit 540.

The interface unit 510 makes communication with the light controlling device 10 in the light gateway 20. In this case, the interface unit 510 may be connected with the light controlling device 10 through the wireless scheme by including an antenna (not shown). Alternatively, the interface unit 510 may be connected with the light controlling device 10 through the wired scheme.

The wireless communication unit 520 makes communication with the light device 30 in the light gateway 20. In this case, the wireless communication unit 520 includes a wireless transmitter to up-convert and amplify the frequency of a transmitted signal and a wireless receiver to low-nose amplify the received signal and down-convert the frequency of the received signal.

The memory 530 includes a program memory and a data memory. The program memory stores programs to control general operations of the light gateway 20. In this case, the program memory may store programs that the light gateway 20 acts as the anchor node 25. The data memory stores data generated in the middle of executing the programs in the light gateway 20. In this case, the data memory may store the identification information and the location information of the light gateway 20 and the anchor light 31.

The control unit 540 controls the overall operation of the light gateway 20. The control unit 540 performs a control operation in the light gateway 20 so that the light gateway 20 acts the anchor node 25. In other words, the control unit 540 searches for the tag light 33. In this case, the control unit 540 detects the tag light 33 by cooperating with the anchor light 31. In addition, the control unit 540 detects the tag location of the tag light 33. In this case, the control unit 540 calculates the tag location of the tag light 33 by cooperating with the anchor light 31. To this end, the control unit 540 includes a calculation unit 541. The calculation unit 541 calculates the tag location of the tag light 33 using location information of the light gateway 20, the distance between the light gateway 20 and the tag light 33, the location information of the anchor light 31, and the distance between the anchor light 31 and the tag light 33. In addition, the control unit 540 requests the light controlling device 10 to register the tag light 33. In this case, the control unit 540 transmits the identification information of the tag light 33 and the location information to represent the tag location of the tag light 33 to the light controlling device 10.

FIG. 7 is a flowchart showing the registration procedure of the light gateway according to the embodiment of the disclosure.

Referring to FIG. 7, according to the registration procedure of the light gateway 20 according to the present embodiment, if the notification of the registration is received from the light controlling device 10, the control unit 540 detects the notification of the registration in step 611 and acts as the anchor node 25 in step 613. In this case, the control unit 540 may receive the identification information and location information of the anchor light 31 from the light controlling device 10. In addition, the control unit 540 may store the identification information and location information of the anchor light 31. In this case, the control unit 540 may notify the registration to the anchor light 31 using the identification information of the anchor light 31. In other words, if the notification of the registration is received from the light controlling device 10, the control unit 540 may forward the notification to the anchor light 31.

Next, if the search instruction is received from the light controlling device 10, the control unit 540 detects the search instruction in step 615, and requests the tag information from the tag light 33 in step 617. In this case, the control unit 540 broadcasts a request message for the tag information. The request message may include the identification information of the light gateway 20.

Subsequently, if the tag information is received from the tag light 33, the control unit 540 detects the tag information in step 619, and calculates the receiving data of the light gateway 20 in step 621. In this case, the control unit 540 calculates the receiving data using the tag information. In this case, the receiving data includes the distance between the light gateway 20 and the tag light 33. For example, the control unit 540 may calculate the distance between the light gateway 20 and the tag light 33 by measuring the receiving signal strength of the tag information.

Thereafter, if the receiving data of the anchor light 31 is received, the control unit 540 detects the receiving data in step 623, and calculates the tag location of the tag light 33 in step 625. In this case, the control unit 540 calculates the tag location of the tag light 33 using the receiving data of the light gateway 20 and the receiving data of the anchor light 31. In addition, the control unit 540 calculates the tag location of the tag light 33 using the location information of the light gateway 20 and the location information of the anchor light 31. In other words, the control unit 540 includes a calculation unit 541. The calculation unit 541 calculates the tag location of the tag light 33 using location information of the light gateway 20, the distance between the light gateway 20 and the tag light 33, the location information of the anchor light 31, and the distance between the anchor light 31 and the tag light 33.

Finally, after the control unit 540 requests the light controlling device 10 to register the tag light 33 in step 627, the registration procedure of the light gateway 20 is terminated. In this case, the control unit 540 transmits the identification information of the tag light 33 and the location information to represent the tag location of the tag light 33 to the light controlling device 10.

FIG. 8 is a block diagram showing the internal structure of the light device according to the embodiment of the disclosure.

Referring to FIG. 8, the light device 30 according to the present embodiment includes a light emitting unit 710, a wireless communication unit 720, a memory 730, a control unit 740, and an input unit 750.

The light emitting unit 710 emits light. In this case, the light emitting unit 710 includes light emitting diode (LED), florescent, incandescent and halogen lamps.

The wireless communication unit 720 makes wireless communication with the light device 30. In this case, the wireless communication unit 720 includes a wireless transmitter to up-convert and amplify the frequency of a transmitted signal, and a wireless receiver to low-noise amplify a received signal and down-cover the frequency of the received signal.

The memory 730 includes a program memory and a data memory. The program memory stores programs to control general operations of the light device 30. In this case, the program memory may store programs allowing the light device 30 to act as the anchor light 31 or the tag light 33. The data memory stores data generated in the middle of executing the programs in the light device 30. In this case, the data memory may store the tag information. In this case, the tag information may include the identification information of the light device 30.

The control unit 740 controls the overall operation of the light device 30. The control unit 740 may perform a control operation so that the light device 30 may act as the anchor light 31. In other words, the control unit 740 may search for the tag light 33. In this case, the control unit 740 may detect the tag light 33 by cooperating with another anchor node 25. In addition, the control unit 740 cooperates with the light gateway 20 so that the light gateway 20 may detect the tag location of the tag light 33. Meanwhile, the control unit 740 may control an action as the tag light 33 in the light device 30. In other words, the control unit 740 may transmit the tag information to the anchor node 25 corresponding to the request of the anchor node 25.

The input unit 750 provides an interface to set and perform various functions of the light device 30. In this case, the input unit 750 may include a switch to turn on or off the light emitting unit 710.

FIG. 9 is a flowchart showing the registration procedure of the light device according to the embodiment of the disclosure.

Referring to FIG. 9, according to the registration procedure of the light device 30 according to the present embodiment, if the notification of the registration is received from the light controlling device 10, the control unit 740 detects the notification in step 811, and acts as the anchor light 31 in step 813. Thereafter, if the search instruction is received from the light controlling device 10, the control unit 740 detects the search instruction in step 815, and requests the tag information from the tag light 33 in step 817. In this case, the control unit 740 broadcasts the request message for the tag information. The request message may include the identification information of the anchor light 31.

Next, if the tag information is received from the tag light 33, the control unit 740 detects the tag information in step 819, and calculates receiving data of the anchor light 31 in step 821. In this case, the control unit 740 calculates the receiving data using the tag information. In this case, the receiving data includes the distance between the anchor light 31 and the tag light 33. For example, the control unit 740 may calculate the distance between the anchor light 31 and the tag light 33 by measuring the receiving signal strength of the tag information. Then, after transmitting the receiving data of the anchor light 31 to the light gateway 20 in step 823, the control unit 740 terminates the registration procedure of the light device 30. In this case, the control unit 740 transmits the identification information of the tag light 33 and the receiving data.

Meanwhile, if the notification of the registration is not received from the light controlling device 10 in step 811, but the anchor node 25 requests the tag information, the control unit 740 detects the request for the tag information in step 831, acts as the tag light 33 in step 833, and transmits the tag information to the anchor node 25. In this case, the tag information includes the identification information of the tag light 33. The control unit 740 may transmit the tag information to the anchor node 25 using the identification information of the anchor node 25. In other words, the control unit 740 may individually transmit the tag information to the light gateway 20 and the anchor light 31. In addition, the control unit 740 may broadcast the tag information. Thereafter, the control unit 740 terminates the registration procedure of the light device 30.

According to the disclosure, the light controlling device 10 may easily register the light device 30. In other words, the light controlling device 10 may search for and register the light device 30 using the anchor node 25. Accordingly, a user of the light controlling device 10 needs neither detect the identification information and location information of the light device 30 nor input the identification information and location information of the light device 30 into the light controlling device 10. To this end, the convenience of the user of the light controlling device 10 can be improved. Accordingly, the efficiency of the light controlling system can be improved.

Meanwhile, the embodiments of the disclosure disclosed in the specification and the accompanying drawings are provided for the illustrative purpose of easily describing the technical contents of the disclosure and making those skilled in the art understand the disclosure, but do not limit the scope of the disclosure. In other words, it is obvious to those skilled in the art that other modifications based on the technical spirit of the disclosure are possible.

The invention claimed is:

1. A registration method of a light device, the registration method comprising:
   collecting tag information from at least one tag light by anchor nodes;
   calculating a location of the at least one tag light based on the collected tag information by the anchor nodes; and
   registering the tag light into a light controlling device based on the tag information and the calculated location by the anchor nodes;
   wherein the calculating of the location comprises:
   calculating a distance between each of the anchor nodes and the tag light by the anchor nodes; and
   calculating the location of the tag light based on a location of each of the anchor nodes and the calculated distance by the anchor nodes.

2. The registration method of claim 1, wherein the anchor nodes include a light gateway, and the calculating of the location is performed by the light gateway.

3. The registration method of claim 2, wherein the anchor nodes comprise an anchor light, and the anchor light comprises at least one light device registered as an anchor node among a plurality of light devices.

4. The registration method of claim 3, wherein, if an anchor light registered as the anchor node exists, the light gateway stores information on a location of the anchor light.

5. The registration method of claim 4, wherein the light gateway calculates a location of the tag light based on the tag information collected by the anchor light and the location calculated by the anchor light, and the information on the location of the anchor light.

6. The registration method of claim 1, wherein the collecting of the tag information is performed at a time point to receive a search instruction for the tag light, which is transmitted from the light controlling device.

7. The registration method of claim 1, further comprising selecting and registering the anchor nodes by the light controlling device.

8. The registration method of claim 1, which the calculating of the location comprises:
   measuring receiving signal strength of the collected tag information; and
   calculating the location of the tag light based on the measured receiving signal strength.

9. The registration method of claim 1, wherein the registering of the tag light comprises:
   transmitting information on the location of the tag light resulting from the collected tag information and the calculated location from the anchor node to the light controlling device; and
   storing the tag information and the location information, which are transmitted, in the light controlling device.

10. A light controlling system comprising:
    at least one light device;
    anchor nodes that searches for the at least one light device, collects tag information of the at least one searched light device, and calculates a location of the at least one light device using the collected tag information; and
    a light controlling device that receives the tag information and location information on the calculated location corresponding to the at least one light device from the anchor nodes, stores the tag information and the location information that are received, and registers the at least one light device;
    wherein the anchor nodes calculate a distance between each of the anchor nodes and the at least one light device using the tag information and calculate a location of the at least one light device based on the location of each anchor node and the calculated distance.

11. The light controlling system of claim 10, wherein the anchor nodes include a light gateway, and the light gateway receives the calculated distance from remaining anchor nodes except for the light gateway among the anchor nodes, and calculates the distance of the at least one light device based on the received distance.

12. The light controlling system of claim 10, wherein the anchor nodes collect the tag information at a time point to receive a search instruction for the at least one light device, which is transmitted from the light controlling device.

13. The light controlling system of claim 10, wherein the anchor nodes are selected and registered by the light controlling device.

14. The light controlling system of claim 10, wherein the light controlling device comprises:
    a display unit that displays a light control image; and
    a control unit that registers at least one light gateway or light device as an anchor node through the light control image displayed on the display unit, and receives and stores tag information and location information of at least one light device, which is unregistered, using the registered anchor node.

15. The light controlling system of claim 14, wherein the control unit stores identification information and location information of the light gateway or the light device registered as the anchor node.

16. The light controlling system of claim 15, wherein the control unit transmits the identification information and the location information of the light device registered as the anchor node to the light gateway registered as the anchor node, if the light device registered as the anchor node exists.

17. The light controlling system of claim 16, wherein the light gateway calculates a location of the at least one searched light device using location information of the light gateway, a distance between the light gateway and a light device corresponding to the collected tag information, a location of the light device registered as the anchor node, and a distance between the location of the light device registered as the anchor node and the light device corresponding to the tag information.

\* \* \* \* \*